(12) United States Patent
Fischer

(10) Patent No.: US 8,335,215 B2
(45) Date of Patent: Dec. 18, 2012

(54) PROCESS DATA FOR A DATA PACKET

(75) Inventor: Uwe E. Fischer, Karlsruhe (DE)

(73) Assignee: SAP AG, Walldorf (DE)

( * ) Notice: Subject to any disclaimer, the term of this patent is extended or adjusted under 35 U.S.C. 154(b) by 610 days.

(21) Appl. No.: 11/491,789

(22) Filed: Jul. 24, 2006

(65) Prior Publication Data

US 2008/0019366 A1    Jan. 24, 2008

(51) Int. Cl.
*H04L 12/28* (2006.01)
*H04L 12/56* (2006.01)

(52) U.S. Cl. .................................... 370/392; 370/465

(58) Field of Classification Search .................. 370/392, 370/465
See application file for complete search history.

(56) References Cited

U.S. PATENT DOCUMENTS

| | | | |
|---|---|---|---|
| 7,174,031 B2* | 2/2007 | Rhoads et al. | 382/107 |
| 2002/0103811 A1* | 8/2002 | Fankhauser et al. | 707/104.1 |
| 2003/0037263 A1* | 2/2003 | Kamat et al. | 713/202 |
| 2005/0262005 A1* | 11/2005 | Woolston | 705/37 |
| 2006/0004820 A1* | 1/2006 | Claudatos et al. | 707/101 |

* cited by examiner

*Primary Examiner* — Jae Y Lee
(74) *Attorney, Agent, or Firm* — Schwegman Lundberg Woessner P.A.

(57) ABSTRACT

Memory stores data for access by a computer program that is capable of being executed on a data processing system. A data structure is stored in the memory, which includes information resident in a database used by the computer program. The information includes payload data made up of data objects, process data for a process associated with the data objects, and a header that includes technical data for transmitting the data structure.

19 Claims, 3 Drawing Sheets

PROCESS DATA FOR A DATA PACKET

TECHNICAL FIELD

This patent application relates, in general, to incorporating process data into a data packet containing a header and payload data.

BACKGROUND

Data transmissions are typically made via data packets that contain a header and a payload. The header includes technical information, such as network addresses and the like, which may be needed for routing or other purposes by a source device, a destination device, and/or devices between the source device and the destination device. The payload, which is said to be encapsulated or wrapped by the header, is the actual data that is being transferred between the source device and the destination device. The payload may also exist without a header as is in file based exchange scenarios.

SUMMARY

This patent application describes methods and apparatus, including computer program products, for incorporating process data into a data packet.

In general, in one aspect, the application is directed to a memory for storing data for access by a computer program capable of being executed on a data processing system. The memory comprises a data structure stored in the memory, where the data structure comprises information resident in a database used by the computer program. The information comprises payload data comprised of data objects, process data for a process associated with the data objects, and a header comprising technical data for transmitting the data structure. This aspect may also include one or more of the following features.

The process data may identify at least one of a type of the process, an owner of the process, and a reference associated with the process. The process data may identify an instance of a target data object and record data associated with the target data object. The record data may include auditing information, where the auditing information identifies accesses to the target data object over time. The target data object may include a hierarchical structure of sub-objects, and the record data may identify an activity in the process associated with at least one of the sub-objects. The header may encapsulate the process data, and the process data may encapsulate the payload data.

In general, in another aspect, the application is directed to a method that comprises receiving a message, where message comprises payload data comprised of data objects, process data for a process associated with the data objects, and a header comprising technical data for transmitting the data structure. The method includes parsing the payload data and the process data from the message, processing the payload data via a first service, and processing the process data via a second service, which may be different from the first service. This aspect may also include one or more of the following features.

Processing the process data may include interpreting the process data to determine action(s) to take on the process data and with respect to business objects in the payload data. The process data may identity at least one of a type of the process, an owner of the process, and a reference associated with the process. The process data may identify an instance of a target data object and record data associated with the target data object. The record data may include auditing information, where the auditing information identifies accesses to the target data object over time. The target data object may include a hierarchical structure of sub-objects, and the record data may identify an activity in the process associated with at least one of the sub-objects. The header may encapsulate the process data, and the process data may encapsulate the payload data. The data objects may be business objects that relate to one or more business processes.

In another aspect, the application is directed to an apparatus comprising memory that stores instructions that are executable, and a processing device to execute the instruction to perform the foregoing method, including one or more of its various features.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

Figure 1:
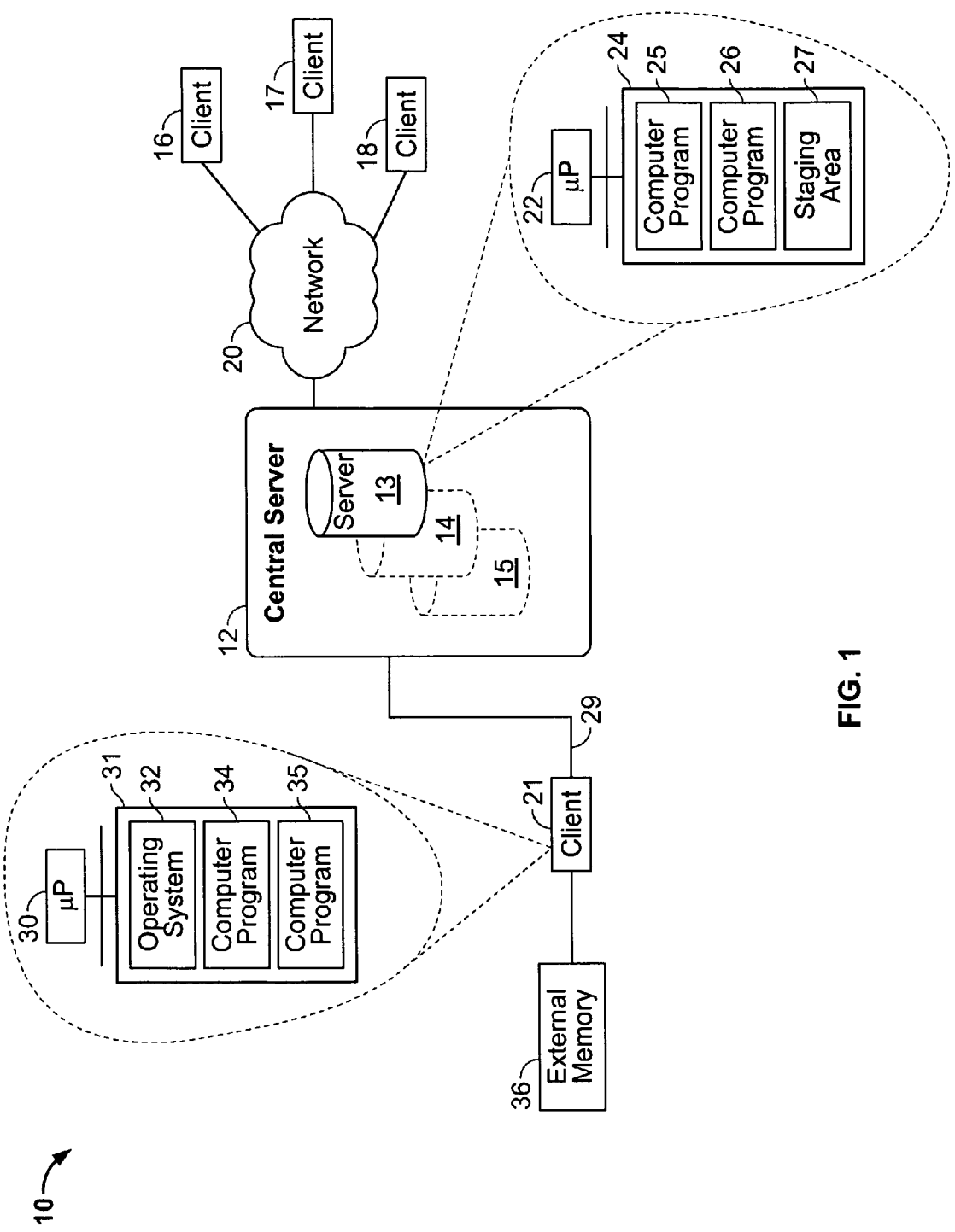
FIG. 1 is a block diagram of a computer system on which the processes described herein may be implemented.

FIG. 1 shows an example of a computer system 10, on which the processes and data structure described herein may be implemented. In this regard, it is noted that the processes and data structure are described below in the context of master data in a central server. The processes and data structure, however, are not limited to this particular use or implementation. Rather, the processes and data structure may be used in the context of any process (e.g., computer program) to transmit/receive any type of payload data.

Referring to FIG. 1, computer system 10 includes a central server 12. Central server 12 may include one or more devices, such as one or more servers 13 to 15, which store a library of data objects. The data objects may be business objects containing data relating to one or more business processes. The data objects constitute master data and are accessible to one or more clients, which are described below. In this context, master data is information that is common to different locations and/or processes in a system landscape. Master data thus can be referenced by multiple systems and/or applications in a system landscape, such as, e.g., a product lifecycle management system, a customer relationship management system, a supply chain management system, and a manufacturing system, even if these systems are executed at different data processing systems in the landscape.

As noted, master data is stored as data objects. Generally, a data object is a collection of information that is grouped together and treated as a primitive in a data processing environment. A data object is generally free of internal references and information stored in a data object can be changed without concomitant changes to the data processing instructions that handle the data object. The information in a data object can be stored in a contiguous block of computer memory of a specific size at a specific location.

The master data may be relevant to data processing activities at the different data processing devices. For example, master data may be relevant to data processing activities, such as interaction with a user at a client, and to data processing activities, such as application software at server 12. Master data may also be relevant to multiple applications at individual data processing devices.

As a consequence of the widespread relevance of master data collections, multiple, corresponding versions of the collections of master data may be stored individually at different data processing devices in computer system 10. Corresponding versions of the master data collections include at least some identical information and are maintained by master data management processes to ensure that this information remains harmonized at the different locations. However, the corresponding versions of the master data collections need not be identical. For example, a collection at one data processing device can be redacted based on the data processing activities commonly performed at that device or based on the data access rights that have been granted to users at that device.

Central server 12 may include one server 13 or multiple servers 13 to 15 (servers 14 and 15 are depicted using dashed lines to indicate that they are optional). In the case of multiple servers, server 13 may act as a controller or "load balancer" for the remaining servers 14 and 15. In this role, server 13 may route data, requests, and instructions between an "external device" (e.g., a client 16) and a "slave" server, such as server 14. For example, 20 server 13 may store data objects locally until it is full, then route data to a server, such as server 14. For the purposes of the following description, such internal communications between server 13 and the slave servers will be assumed.

Server 13 may be any type of processing device that is capable of receiving and storing data, and of communicating with its clients. As shown in FIG. 1, server 13 includes one or more processors 22 and memory 24 that stores computer programs that are executed by processor(s) 22. Memory 24 stores a computer program 25 for communicating with its clients, e.g., to generate messages containing data packets having the structure of FIG. 2 for use by clients 16, 17, 18, and/or 21. Memory 24 also contains a computer program 26 for use in storing data objects (e.g., master data) in central server 12, and may also contain staging area 27 to store, temporarily, updates to master data. Computer program 26 may also implement a change detection process to, among other things, determine if two devices are trying to make concurrent changes to the same master data at server 12.

Client 21 may also be any type of processing device that is capable of receiving data objects and of transmitting data objects to central server 12. A high-speed data link 29, such as Ethernet, may connect client 21 to server 12 in central server 12. The connection may be local or remote. That is, client 21 may also access central server 12 via network 20.

As shown in FIG. 1, client 21 includes one or more processor(s) 30 and memory 31 that stores computer programs that are executed by processor(s) 30. In this regard, memory 31 stores an operating system 32, a computer program 34 that enables communication between client 21 and server 12, and a computer program 35 for use in processing messages received from, e.g., the central server, in the manner described below. Complete copies of data objects (i.e., master data) that are stored in central server 12 may also be stored on client 21 and on each of clients 16 to 18. Furthermore, each client 16 to 18 may have a hardware/software configuration that is the same as, or different than, client 21.

In this regard, clients 16 to 18 and 21 may be computers or any other data processing apparatus including, but not limited to, desktop or laptop computers, personal digital assistants ("PDAs"), gaming devices, and mobile telephones. Network 20 provides a communication link between central server 12 and clients 16 to 18. Network 20 may include, but is not limited to, a local area network ("LAN"), a wide area network ("WAN"), the Internet, and/or a wireless link (e.g., a wireless fidelity, or "Wi-Fi", link).

When data objects are transferred, e.g., from server 12 to client 21, the data objects are transferred in data packets having a specific data structure (or "meta-structure"). This data structure includes a payload and may include a header (heretofore, the data structure contained only a payload and a header). The header contains information needed to transmit the data packet from one location to another. For example, the header may contain source and destination Internet Protocol (IP) addresses, along with any other technical information needed by the source, destination and/or intermediary routing devices.

In this example, the payload may include one or more business objects, along with any metadata associated with the business objects. The metadata may define a hierarchical relationship among business objects, which are referred to herein as "sub-objects", to indicate that the sub-objects are part of a larger structure. The metadata also may contain one or more identifiers for each data object. These identifier(s) may identify the current version of a data object (e.g., on client 21) and the original version of the data object upon which the current version of the data object is based.

The data packets transferred herein contain a third layer, in addition to the payload and the header. The third layer includes process data, referred to herein as "generic application data". The generic application data may be used by a receiving device (e.g., the packet's destination) to determine what action(s) to take with respect to the payload (e.g., business objects) and to identify a context of the message.

Figure 2:
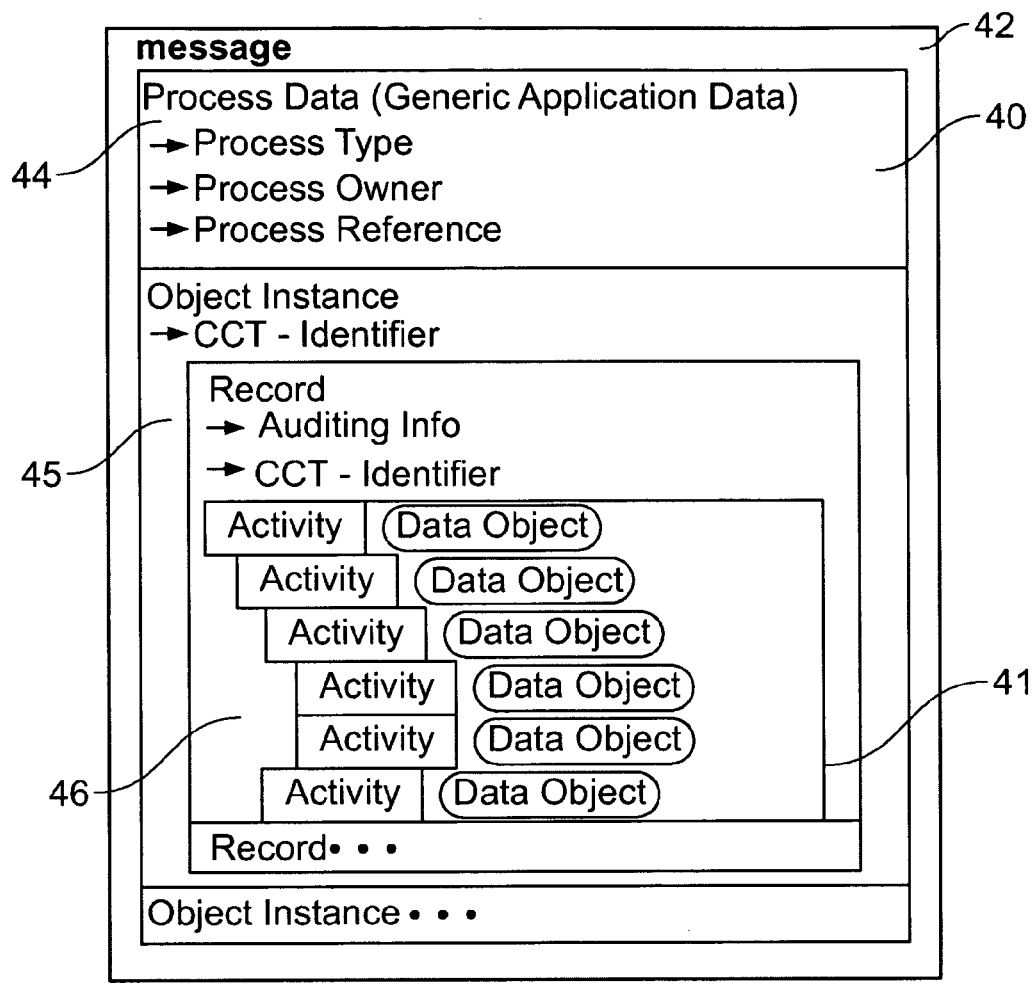
FIG. 2 is a block diagram of a data packet containing a header, process data, and payload data.

As shown in FIG. 2, generic application data 40 can be viewed as a layer that is between payload data 41 and header 42. Conceptually speaking, the header encapsulates the generic application data, and the generic application data encapsulates the payload data. The generic application data can include any information that may be used to further define the payload data. In this regard, the generic application data is neither technical data, like IP addresses (which would be located in the header), or application-specific data, like business object data (which would be located in the payload). Rather, the generic application data is business-specific application-independent data, such as a business process context. In the example of FIG. 2, the generic application data includes generic application data 44, which applies to an entire payload, in this case to all data (e.g., business) objects, in the data packet. The generic application data may include a process type, a process owner and a process reference. The generic application data may also include process hierarchy information, e.g., root process and parent process identifiers.

The process type identifies the type of inbound processing to be triggered in a receiving device in response to the data packet. The process owner identifies a person or device (e.g., the receiving device) that is responsible for maintaining and/or performing the process on the payload data. The process reference, which is also called the "process instance", is an identifier which groups the payload data by semantics (e.g., business). For example the payload data may be part of an initial load process.

Some business processes may be divided into sub-processes. An example of a sub-process includes separate loading of business data by different means (e.g., by parallel sub-processes), which are part of an overall load process. Another example of a sub-process includes loading and re-loading failed business data (e.g., sequential loading), which loading and re-loading are also part of an overall load process. The generic application data may identify the overall process and its sub-process. This enables nesting of processes and efficient reconstruction of a process hierarchy by the receiver.

The generic structure of the data packet also includes information that is specific to one or more business objects. In the example shown in FIG. 2, the generic structure defines a message segment for an object instance 45. In this context, an object instance includes a core component type (CCT) identifier, which identifies object instance 45 to generic and non-generic service(s) in the receiving device that are used to process the object instance. The generic structure of the data packet also permits separation of records of the object instance 45. These records may be associated with subsets of business objects for which activities are to be performed.

As shown in FIG. 2, a record 46 may contain its own separate CCT identifier, along with auditing information. In general, auditing information identifies accesses to data object(s) in a record over time and thereby provides information about the record that may be of potential legal relevance. In the example of FIG. 2, the auditing information may include the date and/or time that data objects(s) in the record were changed, the identity of the user who made such changes, and a handle, such as a pointer, that permits access to more detailed auditing information than is available in the data packet (e.g., in a source/sending system). The auditing information may also include information to identify the version of record 46. More specifically, as explained above, different versions of the same business objects may exist on different systems (e.g., on client 21 and server 12). The auditing information may include one or more tokens that identify a version or version(s) of data objects in the record 46. For example, the auditing information may include timestamps associated with the record or with individual data objects (payload data 41) within the record.

The auditing information may also associate, with one or more data objects, activity codes (labeled "activity"), such as INS (insert), UPD (update), DEL (delete), or a current state. An activity code may be used to indicate, to service(s) on the receiving device, how to process a data object that is part of the payload data in the structure of FIG. 2. Other types of activities may be used in addition to, or instead of, the activities noted here. The activity codes may be part of the data structure shown in FIG. 2, and thus be accessed by generic and non-generic applications that provide or consume the data.

Figure 3:
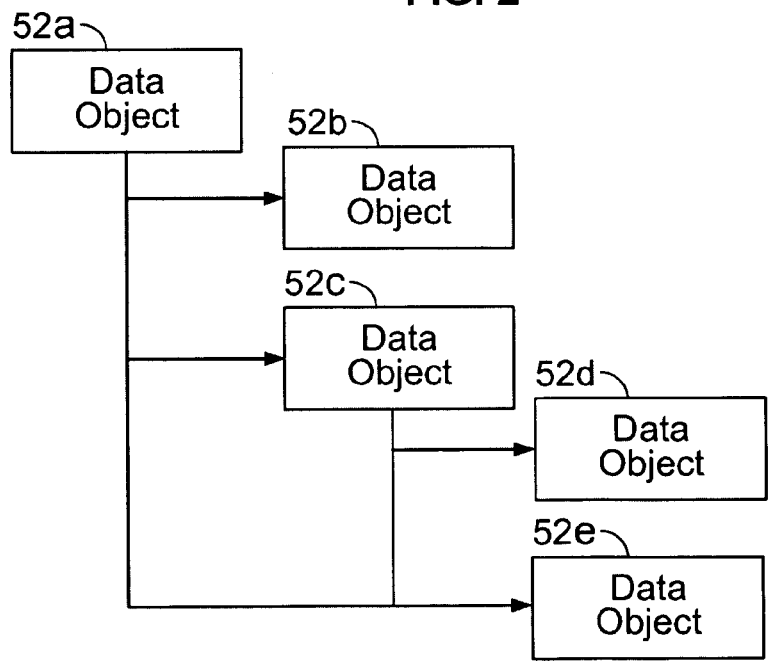
FIG. 3 is a block diagram of payload data in the data packet of FIG. 2.

FIG. 3 depicts the inner structure of a data (e.g., business) object. Data contained in a business object may be grouped into several data objects (52a to 52e). Each data object may reflect specific semantics. Data objects 52a to 52e also may be related to one another in a hierarchical structure. The data structure of FIG. 2 reflects this inner hierarchical structure on the record level 46. In FIG. 2, several data objects 41 are related in a hierarchical structure. A generic activity code may be provided for each data object in the structure, as shown in FIG. 2, to allow generic and non-generic applications that consume the data package to evaluate activities associated with each data object.

Figure 4:
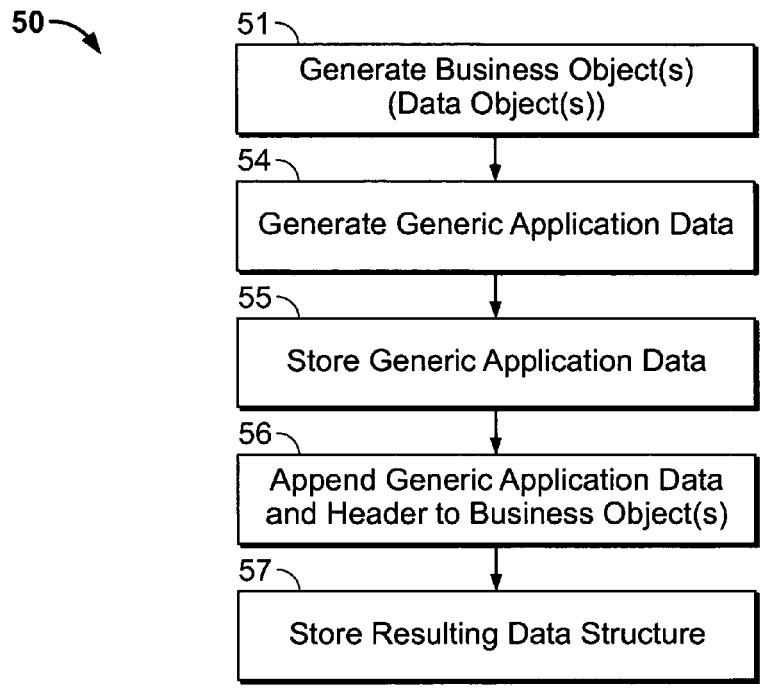
FIG. 4 is a flowchart of a process for generating the data packet of FIG. 2.

FIG. 4 shows a process 50 for generating a data packet containing generic application data. Process 50 may be performed, e.g., on server 12, to generate data packets for transmission to a client device, or vice versa. The data packets may be used, e.g., as part of a synchronization process between server 12 and the client device. Process 50 may be performed by computer program 25 on server 12. It is noted that process 50 may be performed manually, automatically (i.e., without user intervention), or through an interactive process that has both automatic and manual components.

Process 50 includes generating (51) data related to business objects, which may include generic information that relates, e.g., to one or more business processes. Several data objects 52a to 52e may be related to one another. For example, the data objects may be organized hierarchically, as explained above. Populating data objects (e.g., business object data) in the data structure of FIG. 2 may be an application-specific task or, in case of model driven architecture, a generic task.

Process 50 also includes generating (54) generic application data (process data). The generic application data may be generated for a single business object or for a group of business objects, as shown in FIG. 2. The generic application data may be stored (55) in association with corresponding business object(s) or data objects, e.g., pointers in memory may establish a relationship between the two. Prior to, or at the time of, transmission, process 50 may append (56) the generic application data to the business objects (the payload data) and store (57) the resulting data structure in a database or elsewhere (e.g., in a file system). Storage may be permanent or only temporary until transmission.

Figure 5:
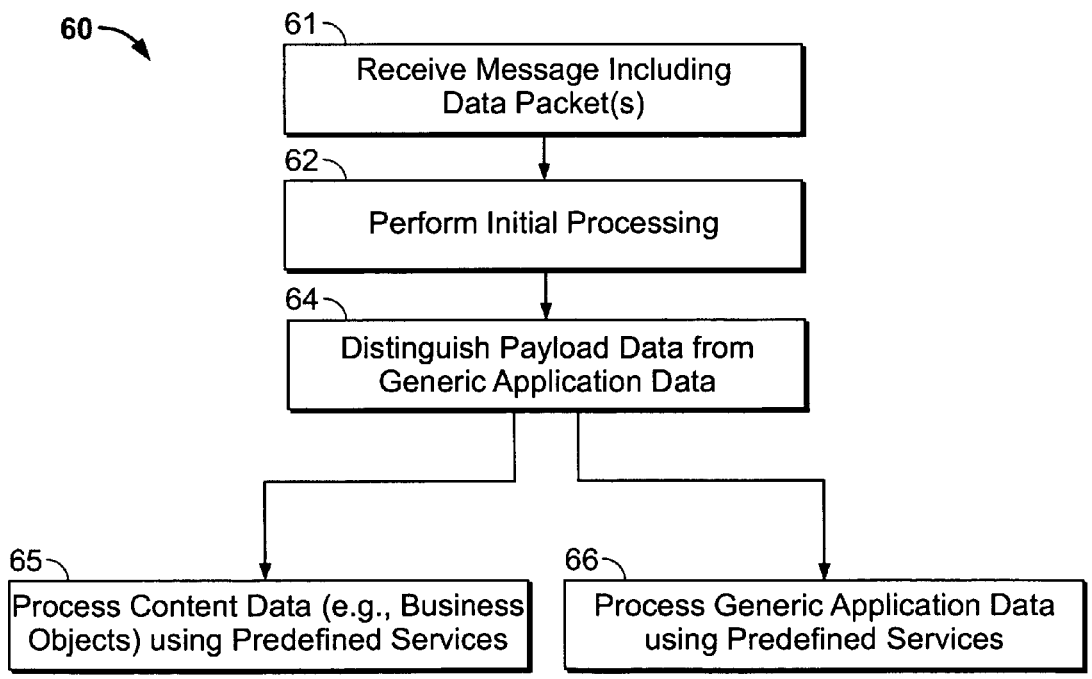
FIG. 5 is a flowchart of a process for processing the data packet of FIG. 2.

FIG. 5 shows a process 60 for processing a data structure, such as a data packet, that contains generic application data of the type described herein. Process 60 may be performed, e.g., on a client 21, to interpret data packets received from a server 12, or vice versa. The data packets may be received, e.g., as part of a synchronization process between server 12 and the client device. In this implementation, process 60 may be performed by computer program 35 on client 21. It is noted that process 60 may be performed manually, automatically (i.e., without user intervention), or through an interactive process that has both automatic and manual components.

Process 60 includes receiving (61) a message that includes a data packet containing generic application data, such as the data packet of FIG. 2. Process 60 performs (62) an initial process on the data packet. For example, process 60 reads the packet header and performs whatever processes are required based on the header. Process 60 also reads the generic application data 44 to identify, e.g., services that may be used to process the content contained in the data packet, e.g. business objects.

Process 60 reads the first object instance data in the data packet (e.g., object instance 45 from FIG. 2), to distinguish/parse (64) the generic application data from the business objects. This may be done via a generic service, which analyzes the data independently of content or semantics, or via a specific service, which is either attached to the header or content analysis. Process 60 processes (65) content (e.g., business object) data using predefined content services, and processes (66) the generic application data using different process services. The process services may be called by the receiving device (in this example, client 12) based on the generic application data and activities identified by the generic application data that are to be performed by the business objects.

Processes 50 and 60, or portions thereof, may be combined or omitted. Processes 50 and 60, and any modifications thereto described above (referred to collectively as "the processes"), are not limited to use with the hardware and software described above; they may find applicability in any computing or processing environment and with any type of machine that is capable of running machine-readable instructions. The processes can be implemented in digital electronic circuitry, computer hardware, firmware, software, or combinations thereof.

The processes can be implemented via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the processes, or any combination of such back-end, middleware, or front-end components. The components of the system can be interconnected by any form or medium of digital data communication, e.g., a communication network. Examples of communication networks include a LAN and a WAN, e.g., the Internet.

Activities associated with the processes can be rearranged and/or one or more such activities can be omitted to achieve the same results described herein. All or part of the processes may be fully automated, meaning that they operate without user intervention, or interactive, meaning that all or part of the processes may include some user intervention.

Elements of different embodiments described herein may be combined to form other embodiments not specifically set forth above. Other embodiments not specifically described herein are also within the scope of the following claims.

The invention claimed is:

1. Memory for storing data for access by a computer program executed on a data processing system, the memory comprising:
    a message data structure stored in the memory, the message data structure comprising information for use by the computer program, the information comprising:
    payload data comprised of data objects;
    process data for a process associated with the data objects, the process data including a process type which identifies a type of inbound processing to be triggered in a receiving device in response to receipt of the message data structure, the process data identifying an owner of the process responsible for the inbound processing, the process data further identifying an overall process that includes a sub-process to load and re-load failed data, the process data encapsulating the payload data; and
    a header comprising technical data for transmitting the message data structure, the header encapsulating the process data.

2. The memory of claim 1, wherein the process data further identifies a reference associated with the process.

3. The memory of claim 1, wherein the data objects are organized hierarchically.

4. The memory of claim 1, wherein the process data further identifies an instance of a target data object and record data associated with the target data object.

5. The memory of claim 4, wherein the record data comprises auditing information, the auditing information identifying accesses to the target data object over time.

6. The memory of claim 4, wherein the target data object comprises a hierarchical structure of sub-objects; and
    wherein the record data identifies an activity in the process associated with at least one of the sub-objects.

7. The memory of claim 1, wherein the sub-process sequentially loads data.

8. A method comprising:
    receiving a message, the message comprising
        payload data comprised of data objects;
        process data for a process associated with the data Objects, the process data including a process type which identifies a type of inbound processing to be triggered in a receiving device in response to receipt of the message data structure, the process data identifying an owner of the process responsible for the inbound processing, the process data further identifying an overall process that includes a sub-process to load and re-load failed data, the process data encapsulating the payload data and
        a header comprising technical data for transmitting the message, the header encapsulating the process data;
    parsing the payload data and the process data from the message;
    processing the payload data via a first service; and
    processing the process data via a second service.

9. The method of claim 8, wherein processing the process data comprises interpreting the process data to determine action to take on the process data and with respect to business objects in the payload data.

10. The method of claim 8, wherein the process data further identifies a reference associated with the process.

11. The method of claim 8, wherein the process data further identifies an instance of a target data object and record data associated with the target data object.

12. The method of claim 11, wherein the record data comprises auditing information, the auditing information identifying accesses to the target data object over time.

13. The method of claim 11, wherein the target data object comprises a hierarchical structure of sub-objects; and
wherein the record data identifies an activity in the process associated with at least one of the sub-objects.

14. The method of claim 8, wherein the data objects comprise business objects that relate to one or more business processes.

15. An apparatus comprising:
memory that stores instructions that are executable; and
a processing device to execute the instruction to perform the following functions:
receiving a message, the message comprising
payload data comprised of data objects;
process data for a process associated with the data objects, the process data including a process type which identifies a type of inbound processing to be triggered in a receiving device in response to receipt of the message data structure, the process data identifying an owner of the process responsible for the inbound processing, the process data further identifying an overall process that includes a sub-process to load and re-load failed data, the process data encapsulating the payload data; and
a header comprising technical data for transmitting the message, the header encapsulating the process data;
parsing the payload data and the process data from the message;
processing the payload data via a first service; and
processing the process data via a second service.

16. The apparatus of claim 15, wherein processing the process data comprises interpreting the process data to determine action to take with respect to business objects in the payload data.

17. The apparatus of claim 15, wherein the process data further identifies a reference associated with the process.

18. The apparatus of claim 15, wherein the process data further identifies an instance of a target data object and record data associated with the target data object.

19. The apparatus of claim 18, wherein the record data comprises auditing information, the auditing information identifying accesses to the target data object overtime.

* * * * *